US009873038B2

(12) United States Patent
Hooke et al.

(10) Patent No.: US 9,873,038 B2
(45) Date of Patent: Jan. 23, 2018

(54) INTERACTIVE ELECTRONIC GAMES BASED ON CHEWING MOTION

(71) Applicant: Intercontinental Great Brands LLC, East Hanover, NJ (US)

(72) Inventors: William Roland Hooke, Stevenage (GB); Katherine Anne Harrison, Oxford (GB)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 14/898,047

(22) PCT Filed: Jun. 13, 2014

(86) PCT No.: PCT/US2014/042299
§ 371 (c)(1),
(2) Date: Dec. 11, 2015

(87) PCT Pub. No.: WO2014/201347
PCT Pub. Date: Dec. 18, 2014

(65) Prior Publication Data
US 2016/0136516 A1 May 19, 2016

Related U.S. Application Data

(60) Provisional application No. 61/835,244, filed on Jun. 14, 2013.

(51) Int. Cl.
*A63F 9/24* (2006.01)
*A63F 13/40* (2014.01)
(Continued)

(52) U.S. Cl.
CPC ............... *A63F 9/24* (2013.01); *A63F 13/10* (2013.01); *A63F 13/12* (2013.01); *A63F 13/213* (2014.09);
(Continued)

(58) Field of Classification Search
None
See application file for complete search history.

(56) References Cited

U.S. PATENT DOCUMENTS 5,884,257 A    3/1999  Maekawa et al.
6,215,471 B1   4/2001  DeLuca
(Continued)

*Primary Examiner* — Jason Yen
(74) *Attorney, Agent, or Firm* — Fitch, Even, Tabin & Flannery LLP

(57) ABSTRACT

An interactive game in which one or more game characters are controlled by chewing, or other mouth-related movements of one or more players. The game may be used in conjunction with marketing of a chewable product, and the game may include a feature in which data associated with a particular product may be detected by a device associated with the game to affect play of the game. The data may be in the form of graphics such as a QR code, bar code or other code on the package interior or exterior that may be read by a camera, or may be in other forms, e.g., a code provided on a website, in an e-mail or text message, or in another way, to be entered manually by the player. The game may be played on a mobile electronic device. The game play may comprise one or more actions of the character(s) that are caused by one or more different mouth movements of the player(s). The actions of the characters caused by the mouth movements of the users may comprise actions that are different from and normally unrelated to mouth movements, e.g., walking, running, jumping, swinging, spinning, falling, flying, climbing, or other movements involving travel of the character.

18 Claims, 10 Drawing Sheets

(51) Int. Cl.
*A63F 13/30* (2014.01)
*A63F 13/428* (2014.01)
*A63F 13/655* (2014.01)
*A63F 13/213* (2014.01)
*A63F 13/23* (2014.01)
*A63F 13/52* (2014.01)
*A63F 13/92* (2014.01)

(52) U.S. Cl.
CPC ............ *A63F 13/23* (2014.09); *A63F 13/428* (2014.09); *A63F 13/52* (2014.09); *A63F 13/655* (2014.09); *A63F 13/92* (2014.09); *A63F 2009/2435* (2013.01); *A63F 2009/2447* (2013.01); *A63F 2009/2457* (2013.01); *A63F 2009/2488* (2013.01); *A63F 2300/1093* (2013.01); *A63F 2300/556* (2013.01); *A63F 2300/5553* (2013.01); *A63F 2300/695* (2013.01)

(56) References Cited

U.S. PATENT DOCUMENTS

| | | |
|---|---|---|
| 6,471,420 B1 | 10/2002 | Maekawa et al. |
| 6,720,949 B1 | 4/2004 | Pryor et al. |
| 6,771,277 B2 | 8/2004 | Ohba |
| 7,042,440 B2 | 5/2006 | Pryor et al. |
| 7,391,888 B2 | 6/2008 | Hu et al. |
| 7,650,017 B2 | 1/2010 | Yamada |
| 7,815,507 B2 | 10/2010 | Parrott et al. |
| 7,844,086 B2 | 11/2010 | Hu et al. |
| 7,894,637 B2 | 2/2011 | Noguchi et al. |
| 7,933,431 B2 | 4/2011 | Pryor |
| 7,971,157 B2 | 6/2011 | Markovic et al. |
| 7,996,793 B2 | 8/2011 | Latta et al. |
| 8,111,239 B2 | 2/2012 | Pryor et al. |
| 8,113,953 B2 | 2/2012 | Ohba et al. |
| 8,135,183 B2 | 3/2012 | Hu et al. |
| 8,145,594 B2 | 3/2012 | Geisner et al. |
| 8,209,636 B2 | 6/2012 | Cheng |
| 2005/0245838 A1* | 11/2005 | Kuramori ............ A61B 5/0488 600/546 |
| 2007/0071425 A1* | 3/2007 | Horinouchi ............ A63F 13/08 396/54 |
| 2007/0259716 A1 | 11/2007 | Mattice et al. |
| 2008/0317264 A1 | 12/2008 | Wynnychuk |
| 2010/0007665 A1* | 1/2010 | Smith ...................... G06T 13/40 345/473 |
| 2010/0079371 A1 | 4/2010 | Kawakami et al. |
| 2010/0125816 A1 | 5/2010 | Bezos |
| 2010/0199228 A1 | 8/2010 | Latta et al. |
| 2010/0199231 A1 | 8/2010 | Markovic et al. |
| 2010/0211918 A1 | 8/2010 | Liang et al. |
| 2010/0240458 A1 | 9/2010 | Gaiba et al. |
| 2010/0278393 A1 | 11/2010 | Snook et al. |
| 2010/0281432 A1 | 11/2010 | Geisner et al. |
| 2010/0281439 A1 | 11/2010 | Markovic et al. |
| 2010/0302138 A1 | 12/2010 | Poot et al. |
| 2010/0302247 A1 | 12/2010 | Perez et al. |
| 2010/0306712 A1 | 12/2010 | Snook et al. |
| 2010/0306713 A1 | 12/2010 | Geisner et al. |
| 2010/0306714 A1 | 12/2010 | Latta et al. |
| 2010/0306715 A1 | 12/2010 | Geisner et al. |
| 2010/0306716 A1 | 12/2010 | Perez |
| 2011/0035666 A1 | 2/2011 | Geisner et al. |
| 2011/0055846 A1 | 3/2011 | Perez et al. |
| 2011/0093820 A1 | 4/2011 | Zhang et al. |
| 2011/0119640 A1 | 5/2011 | Berkes et al. |
| 2011/0143838 A1 | 6/2011 | Lee et al. |
| 2011/0154266 A1 | 6/2011 | Friend et al. |
| 2011/0169726 A1 | 7/2011 | Holmdahl et al. |
| 2011/0173204 A1 | 7/2011 | Murillo et al. |
| 2011/0173574 A1 | 7/2011 | Clavin et al. |
| 2011/0223995 A1 | 9/2011 | Geisner et al. |
| 2011/0289455 A1 | 11/2011 | Reville et al. |
| 2011/0289456 A1 | 11/2011 | Reville et al. |
| 2011/0298827 A1 | 12/2011 | Perez |
| 2011/0304707 A1 | 12/2011 | Oyagi |
| 2012/0050157 A1 | 3/2012 | Latta et al. |
| 2012/0148161 A1* | 6/2012 | Kim ........................ G06T 13/40 382/195 |
| 2012/0200492 A1 | 8/2012 | Zhao |
| 2012/0278759 A1 | 11/2012 | Curl et al. |
| 2012/0327125 A1 | 12/2012 | Kutliroff et al. |
| 2013/0066526 A1 | 3/2013 | Mondragon et al. |

\* cited by examiner

INTERACTIVE ELECTRONIC GAMES BASED ON CHEWING MOTION

CROSS-REFERENCE TO RELATED APPLICATION

This application is a U.S. National Phase application filed under 35 U.S.C. §371 of International Application No. PCT/US2014/042299, filed Jun. 13, 2014, designating the United States, which claims the benefit of U.S. Provisional Application No. 61/835,244, filed Jun. 14, 2013, which are incorporated by reference herein in their entireties.

The following computer program listings written in Objective C code are incorporated by reference herein: CBFaceTracker.h.txt (8,313 bytes); and CBFaceTracker-.m.txt (66,251 bytes), each bearing creation dates of May 9, 2012.

COPYRIGHT NOTICE

The computer program listings portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Methods and devices for controlling interactive electronic games are described herein, along with related methods of marketing.

BACKGROUND

The use of electronic mobile devices such as cellular phones and tablet computers to play interactive games has been increasing in popularity. Some interactive games may be freely downloaded onto mobile devices from a remote server while some games require advance payment before the games may be downloaded. A variety of electronic games, initially downloadable for free, may include optional in-game content that is not free and requires a payment. Such electronic games are limited in that they only generate revenue based on in-game purchases.

Electronic games playable on mobile devices may be controlled by users via manipulation of one or more input keys and/or multiple control icons visible on the display screen of the mobile devices during game play. Some electronic games may additionally be controlled by moving, for example, tilting, the mobile device in addition to manipulating input keys and/or on-screen control icons. Some games rely on gesture recognition to control game play, e.g., golf or tennis games in which the user's simulation of a golf or tennis swing determines a virtual trajectory of a virtual ball.

SUMMARY

A method of controlling an interactive game on a display screen of a mobile electronic device according to one embodiment includes displaying on the display screen of the mobile electronic device the interactive game including a character controllable by a user of the mobile electronic device. The method further includes detecting, using a camera, position or motion of a body part of the user such as the user's mouth, e.g., opening the mouth or performing a chewing motion, and causing the character to perform one or more actions on the display screen in response thereto. The first action of the character may be, for example, running, jumping, swinging, or other movements unrelated to the position or motion detected by the camera. In one particular embodiment, the game involves a character swinging or spinning around a first point, disconnecting from the first point, moving upward to a second point, swinging around the second point, then repeating these steps with successive movements upward, downward and/or laterally. In this embodiment, the user's chewing at any speed may increase the speed of swinging or spinning by a fixed amount and the user's opening his or her mouth may disconnect the character from one point in order to move to the next. The method may be used in a game that is provided in connection with marketing of a chewable product such as gum.

The displaying of the interactive game may include a means of providing feedback to the user concerning the game's detection of a mouth movement that will have an effect on the game character. This may comprise, e.g., displaying a window overlaying a portion of the interactive game display on the screen, and displaying in the window a real time video of at least the mouth or the face of the user captured by the camera. The window may be displayed during calibration, prior to initiation of game play, and/or during game play in the same or a different location. Keeping the window in the same location on screen may help the player to keep the camera appropriately positioned and oriented. The method may include use of a virtual grid to detect distances of lips and other related pixels of interest. The method may include displaying in the window the virtual grid overlaying at least the mouth of the user and modifying the virtual grid in real time in response to chewing motion of the user.

In one approach, the detecting of the chewing motion of the user includes detecting the chewing motion of the user by determining, via the camera, position of at least one of chin, jaw, lips, and mouth of the user relative to a position of a virtual grid overlaying at least the mouth of the user. The method may further include calibrating the chewing motion of the user relative to the virtual grid prior to initiating start of the interactive game.

In another approach, the detecting of the chewing motion of the user includes detecting a speed of the chewing motion of the user and causing the character on the display screen to move faster in response to detecting an increase in the speed of the chewing motion and to move slower in response to detecting a decrease in the speed of the chewing motion.

The method may include detecting one or more additional user activities, such as opening the mouth of the user, and causing the virtual character to perform one or more additional actions in the interactive game different from the first action in response to the one or more additional user activities.

In one approach, the method may include taking a photograph of the face of a user when a session of the video game ends, and incorporating at least a portion of the photograph into a graphic of the interactive game including a score accumulated by the user while playing the interactive game. The method may further include permitting the user to share the graphic with one or more people via at least one of an electronic mail, a text message, and a social media website.

The method may further include scanning an image on the packaging of a consumer product using the mobile electronic device and incorporating data retrieved in response to the scanning of the image into the interactive game to affect game play.

In the aforementioned method, the mobile electronic device may be at least one of a mobile phone, a tablet computer, and a hand-held video game console.

In one embodiment, an apparatus configured to allow play of an interactive game includes a display screen, a camera, a memory storing instructions relating to the interactive game, and a processing device in operative communication with the display screen, the camera, and the memory. The processing device is configured to access the instructions to effect displaying on the display screen the interactive game including a character controllable by a user of the electronic device; and displaying a window overlaying a portion of the interactive game on the display screen to show an image of at least a mouth of the user captured by the camera; detecting the chewing motion of the user by determining, via the camera, position of at least one of a chin, a jaw, a lip, and a mouth of the user relative to a virtual grid; and causing the character to perform a first action on the display screen in response to the chewing motion by the user.

In one approach, the processing device is further configured to effect detecting opening of the mouth of the user and causing the character to perform a second action different from the first action on the display screen.

The processing device may be further configured to effect using the camera to take a photograph of at least a face of the user when a session of the interactive game ends and incorporating at least a portion of the photograph into a graphic of the interactive game including a score accumulated by the user while playing the interactive game.

The processing device may be further configured to effect using the camera to scan an image on a packaging of a consumer product and incorporate data retrieved in response to the scanning of the image into the interactive game to affect game play.

In an embodiment, a non-transitory computer readable storage medium for storing instructions is provided. The instructions, in response to execution by a processor, cause the processor to perform operations for displaying and controlling an interactive game on an electronic device. The operations include displaying on the display screen of the electronic device the interactive game including a character controllable by a user of the electronic device; detecting, using a camera, chewing motion of the user; and causing the character to perform a first action on the display screen in response to the chewing motion of the user.

The non-transitory computer readable storage medium may further comprise instructions that, in response to execution by the processor, cause the processor to perform further operations comprising detecting opening of a mouth of the user and causing the virtual character to perform a second action different from the first action on the display screen.

The non-transitory computer readable storage medium may further comprise instructions that, in response to execution by the processor, cause the processor to perform further operations comprising taking a photograph of at least a face of the user when a session of the interactive game ends and incorporating at least a portion of the photograph into a graphic of the interactive game including a score accumulated by the user while playing the interactive game.

The non-transitory computer readable storage medium may further comprise instructions that, in response to execution by the processor, cause the processor to perform further operations comprising scanning an image on a packaging of a consumer product and incorporating data retrieved in response to the scanning of the image into the interactive game to affect game play.

A method of interacting with customers of a chewable product through a game is provided. The method includes marketing a plurality of different chewable products to customers; providing a game that is playable on a hand-held device that includes a camera and a display screen; displaying an image of a game character that is capable of travel relative to other images on the screen; processing input from the camera to detect a chewing motion of a mouth of a player; and in response to detection of the chewing motion, affecting travel of the game character displayed on the screen such that game play is controlled at least partially by detection of the chewing motion.

The method may further include detecting packaging of the plurality of different chewable products with the camera, and affecting the game play in response to the detection of such packaging in different ways depending on which of the plurality of different chewable products is detected.

The method may further include accelerating movement of the game character relative to images in a 2D vertically scrolling world in response to the player's chewing.

The processing of the input from the camera may include detecting a nose and chin in a first frame using software running on a CPU; detecting a relatively dark region between the mouth and chin in subsequent frames using software running on a graphics processing unit; and comparing changes in and adjacent to the relatively dark region from frame to frame by analysis of individual pixels using a graphics processing unit.

The aforementioned methods and devices permit users of mobile electronic devices to intuitively control interactive electronic games on mobile devices without complicated controls, but simply by chewing motion and/or other mouth movements. In addition, the aforementioned methods and devices provide interactive electronic games on mobile devices that may promote consumer products such as chewing gum. Further advantages may be appreciated with reference to the following drawings, detailed description, and claims.

DETAILED DESCRIPTION

An interactive electronic game as described herein may be controlled by the chewing motion of a user. In particular, the electronic mobile device may include one or more cameras positioned to face one or more users and to observe and detect chewing motion by the user(s), which chewing motion is then translated into movement of one or more in-game characters on a display screen of the mobile device. The interactive electronic games described herein provide intuitive game play, requiring little or no instruction and continuous game flow, which may facilitate longer game play sessions by users.

Figure 1:
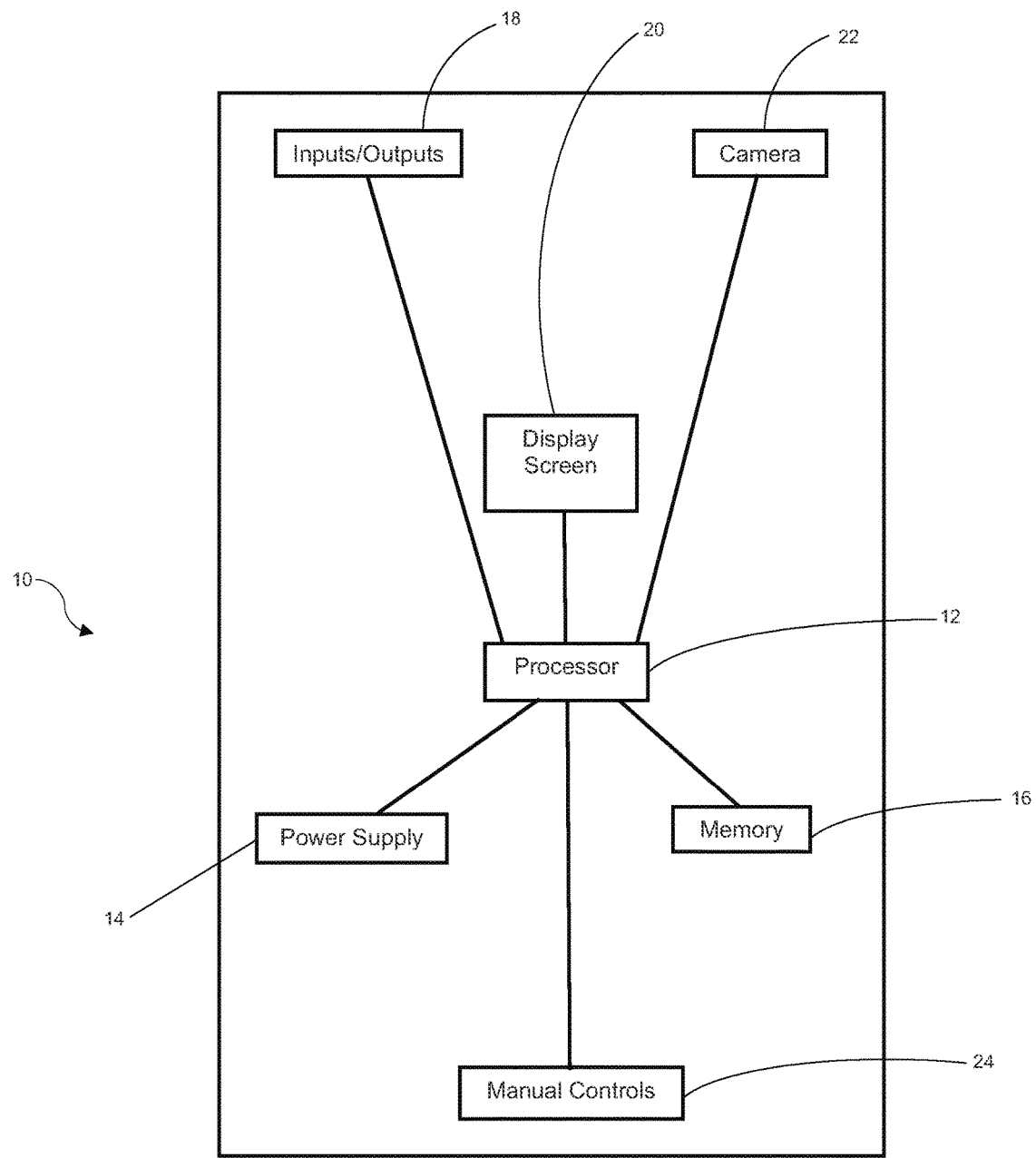
FIG. 1 is a schematic diagram of an exemplary mobile device for use in running, displaying, and controlling interactive electronic games as described herein.

FIG. 1 illustrates a graphical representation of an exemplary electronic mobile device 10 for running interactive games and implementing methods of controlling interactive games as described herein. The mobile device 10 of FIG. 1 includes a processor 12 electrically coupled to a power supply 14, a memory 16, inputs/outputs 18, a display screen 20, a camera 22, and manual controls 24. The processor 12 may be processor programmable to run an operating system and/or software applications on the mobile device 10, as well as to execute instructions to cause software applications to perform various functions, such as during play of an interactive game stored on the mobile device 10. The power supply 14 may be a battery or battery pack that provides power to the mobile device 10. The memory 16 may be, for example, volatile or non-volatile memory (e.g., a non-transitory storage medium such as a hard drive) capable of storing an operating system and software programs including interactive electronic games. The inputs/outputs 18 may include audio inputs/outputs such as an audio receiver, a microphone and a speaker usable, for example, during phone calls using the mobile device 10. The inputs/outputs 18 may also include wireless transmitter and receiver for sending and receiving wireless signals during phone calls and Internet access by the mobile device 10. The manual controls 24 may include one or more keys that may be depressed by the user to control one or more functions of the mobile device 10, such as activating and closing applications, switching between applications, and rebooting the mobile device 10.

The display screen 20 may be, for example, an LCD, TFT-LCD, and/or LED electronic visual display that displays content running on the mobile device 10 to a user. The display 20 may be a touch-screen display or a display that relies solely on input keys. The camera 22 may include one or more cameras incorporated into the mobile device 10. For example, the mobile device may include one "rear-facing" camera 22 positioned such that a user's face is visible to the camera when the mobile device 10 is oriented such that the user faces the display screen 20, and one front-facing camera 22 positioned such that the camera 22 points away from the user's face when the mobile device 10 is oriented such that the display screen 20 is facing away from the user. In a mobile device 10 having a rear-facing camera 22 and a front-facing camera 22, the interactive game 100 may be alternatively or simultaneously played by two users—a first user facing the rear-facing camera 22 and a second user facing the front-facing camera 22.

Figure 2:
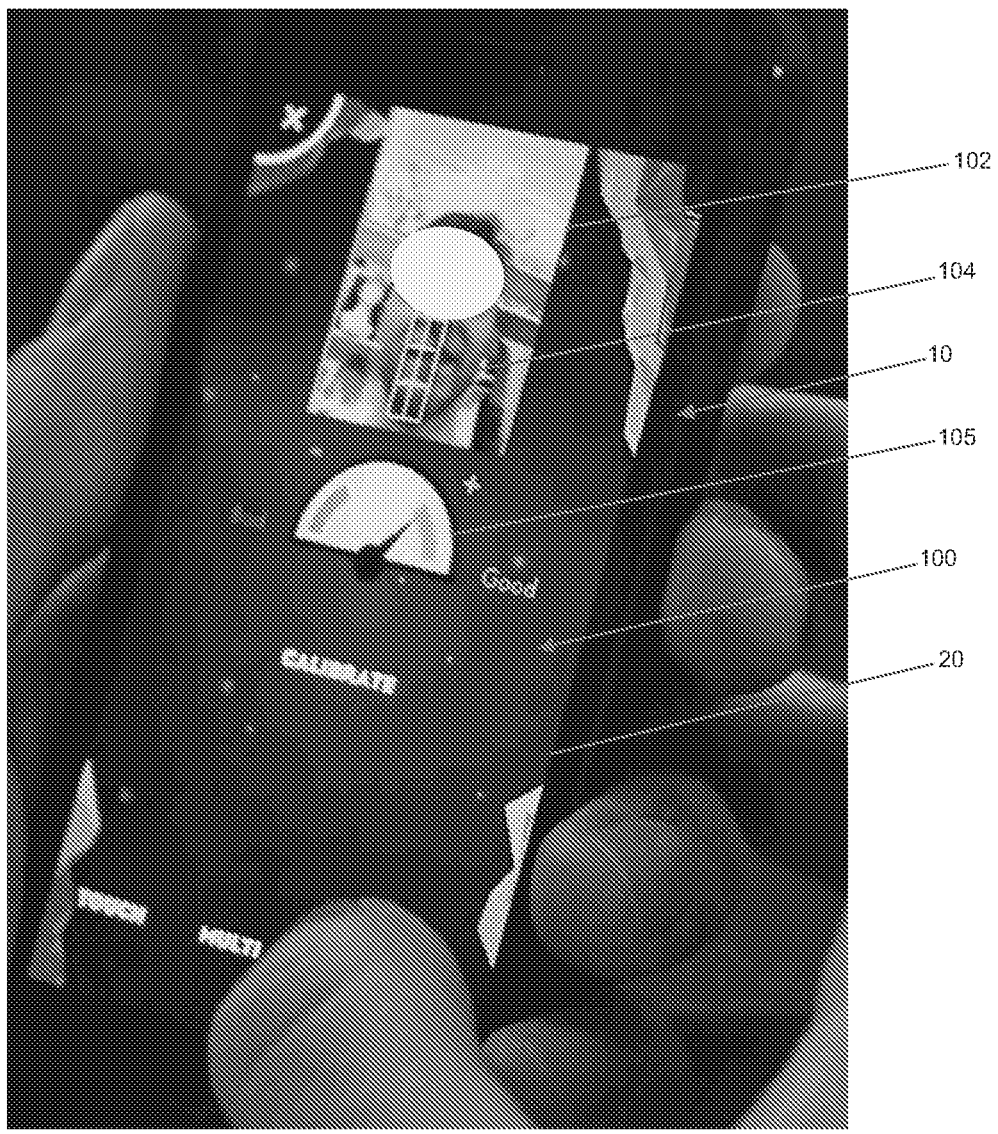
FIG. 2 is a perspective view of the mobile device of FIG. 1 showing a calibration feature of an exemplary interactive electronic game.

FIG. 2 illustrates the mobile device 10 displaying on its display screen 20 a screen shot of an interactive game 100 according to one exemplary embodiment. The interactive game 100 generates a window 102 overlaying a portion of the interactive game 100 on the display screen 20. A real-time video feed of the user as captured by the camera 22 is displayed in the window 102, as shown in FIG. 2. Portions of the user's head, face, mouth, lips, and other facial features may be visible in the window 102. Because this example interactive game 100 is controlled by the chewing motion of the user, in one embodiment, only the mouth of the user may be displayed in the window 102.

The interactive game 100, using the camera 22, permits a user to calibrate the user's mouth movement to provide precise control of the interactive game 100 via the user's chewing motion. In the embodiment shown in FIG. 2, prior to initiating play of the interactive game 100, the chewing motion of the user is calibrated via a virtual grid 104 positioned at least in part over a mouth of the user. The virtual grid 104 is movable in real time in response to the chewing motion of the user. The interactive game 100 may include a calibration indicator 105 that is visible to the user and indicates to the user a whether the calibration is successful or not. In the embodiment illustrated in FIG. 2, the calibration indicator 105 may include an area (e.g., "Good") correlating to a successful calibration of the chewing motion of the user relative to the virtual grid 104. It is to be appreciated that while the virtual grid 104 is depicted as being visible to the user in FIG. 2, the virtual grid 104 may optionally be invisible to the user during calibration and/or game play.

For purposes of this application, "chewing motion" is defined as movement of one or more of the lips of a user when the mouth of the user is closed and/or open, movement of areas of the face of the user surrounding the lips, chin, and jaw of the user generated when chewing or imitating chewing of a chewable product such as food, gum, or the like. For example, game play of an interactive game may comprise one or more actions of the in-game character(s) that are caused by one or more different mouth movements (during actual chewing or during emulation of chewing) of the user(s) playing the game. The actions of the game characters caused by the mouth movements of the users may comprise actions that are different from and normally unrelated to mouth movements, for example, walking, running, jumping, swinging, spinning, falling, flying, climbing, or other movements involving travel of the character.

Figure 5:
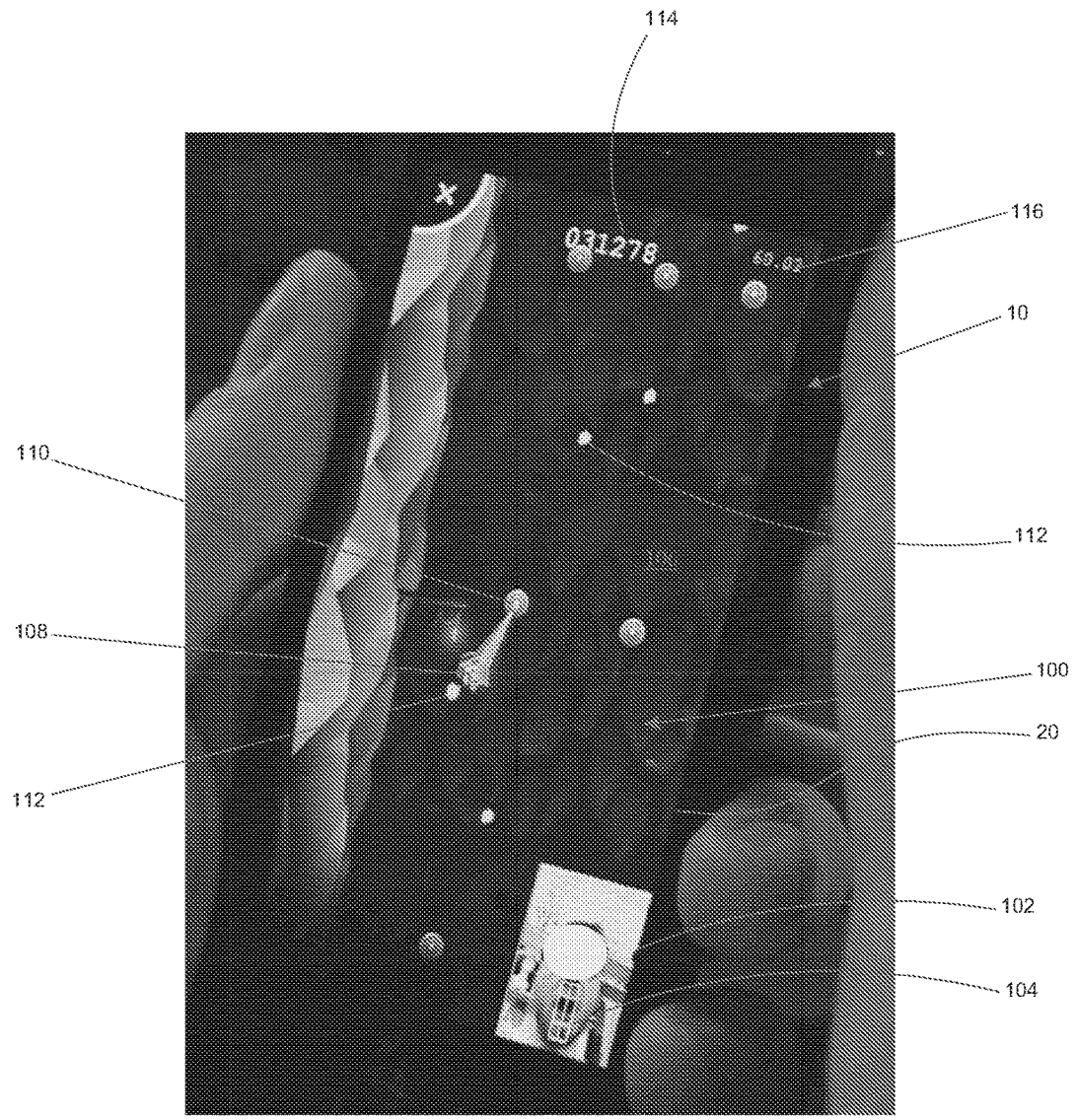
FIG. 5 is a perspective view of the mobile device of FIG. 1 showing game play where the player character is again connected to a swing point and the user's mouth is more open than in FIG. 3.

In the illustrated form, the interactive game 100 detects the chewing motion of the user by determining, via the camera 22, position of one or more of the mouth, lips, chin, or jaw of the user relative to a position of the virtual grid 104 overlaying at least the mouth of the user. For example, when the mouth of the user is more closed as shown in FIG. 3, the virtual grid 104 has a first height, and when the mouth of the user is more open as shown in FIG. 5, the virtual grid 104 is at a second height that is greater than the first height.

As discussed above, the interactive game 100 detects chewing motion of the user to control game play. Preferably, the interactive game 100 includes facial recognition features that provide for minimal latency between the chewing motion of the user and game response. The interactive game 100 may include face tracking software, as described in more detail in reference to FIG. 11, that provides a smooth game play in light of slight occlusion, various light levels, and variable source imagery. In one approach, in a condition where ambient conditions prevent or restrict play of the interactive game 100, the interactive game 100 may pause or shut down and inform the user of one or more issues preventing or restricting game play and a solution to the issue.

Figure 3:
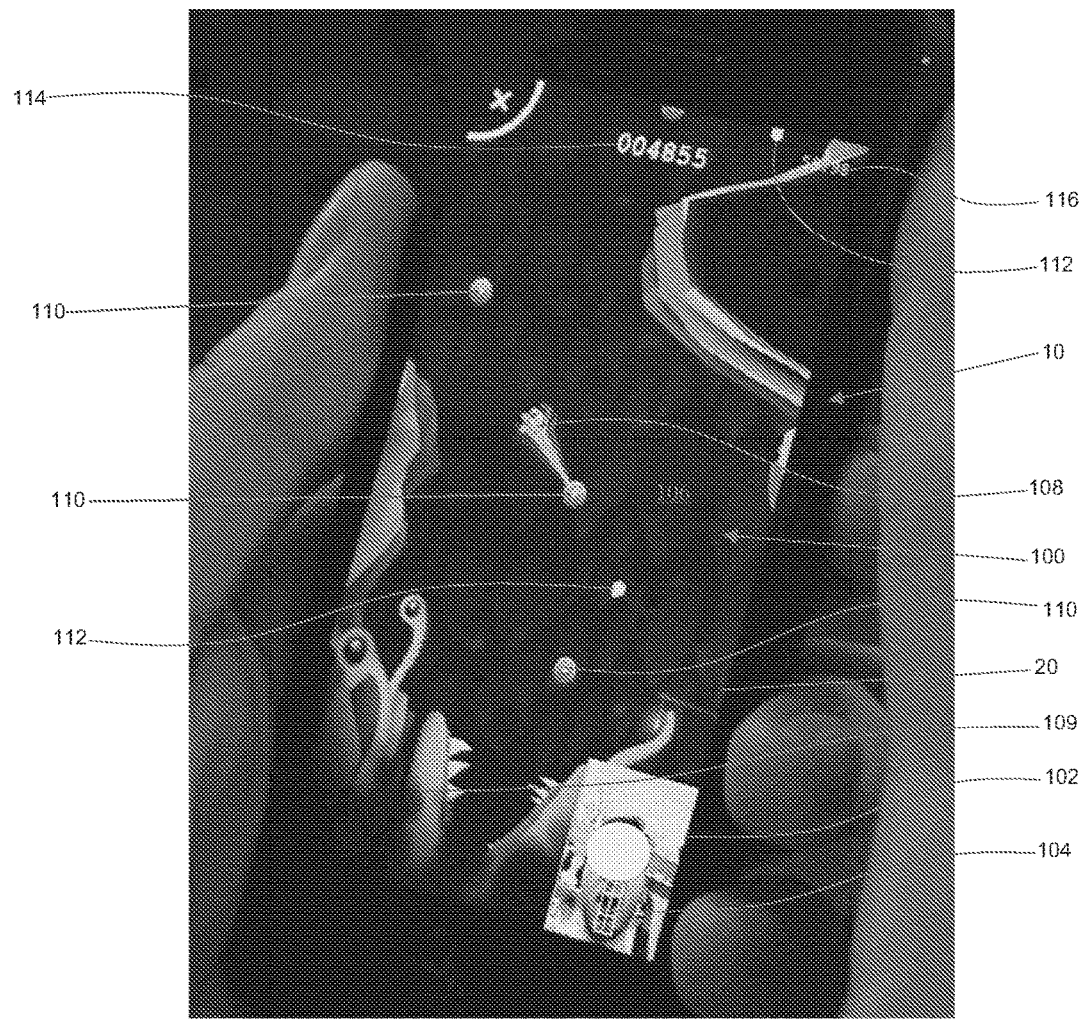
FIG. 3 is a perspective view of the mobile device of FIG. 1 showing game play where a player character is swinging about a swing point and a monster having an open mouth is at a base of the display screen.

FIG. 3 depicts a screenshot of the exemplary interactive game 100 during game play. The interactive game 100 is illustrated in an environment of a 2D vertically scrolling world 106, where the objective is to progress movement of a game or player-controlled character 108 upwards while avoiding "jeopardy" such as a monster 109 or an environment such as a hole, fire, or water that permits the player character 108 to fall in and perish at the base of the display screen 20. During game play of the interactive game 100, the player character 108 is visible to the user on the display screen 20 of the mobile device 100 as shown in FIGS. 3-5.

Figure 4:
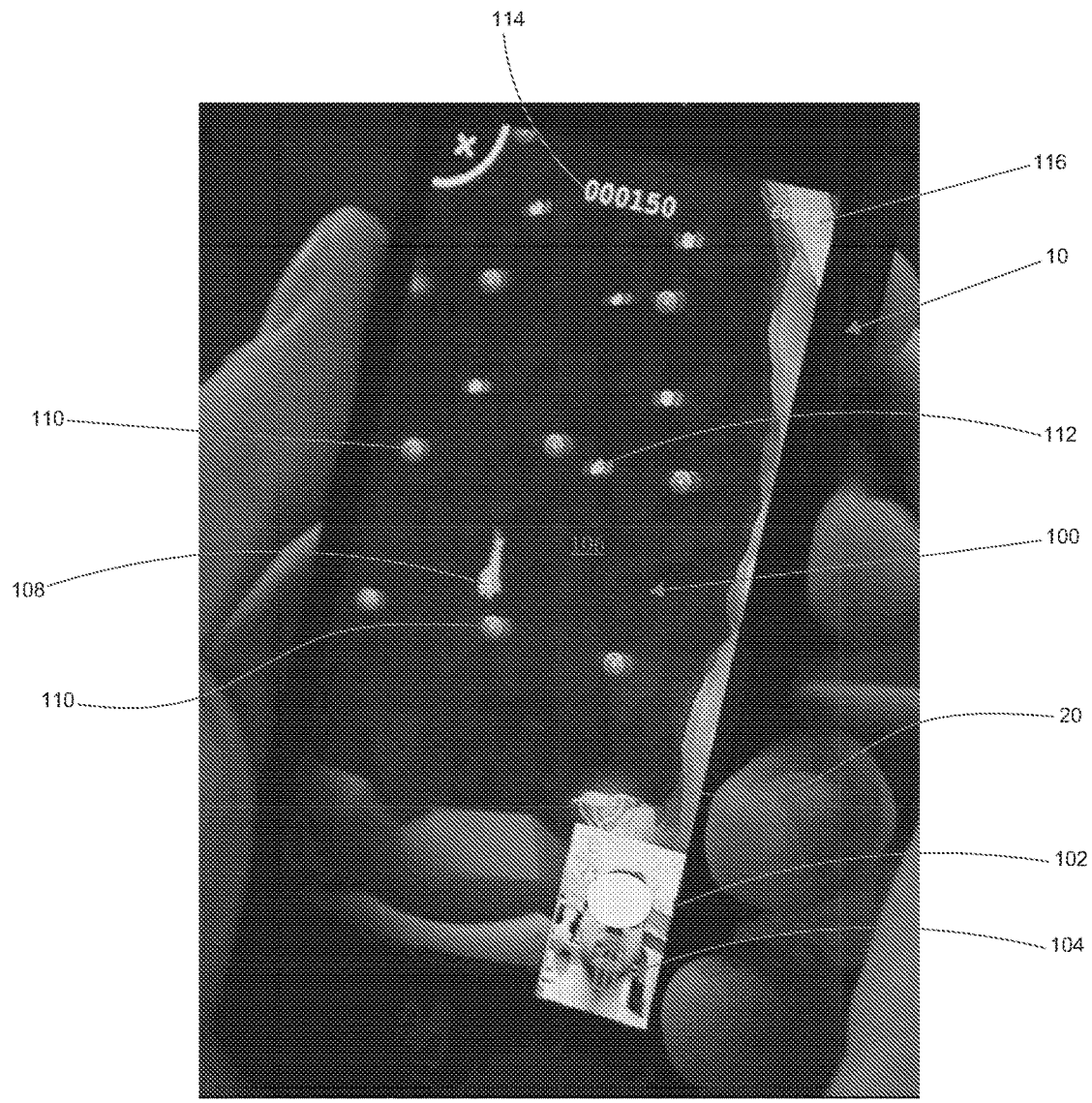
FIG. 4 is a perspective view of the mobile device of FIG. 1 showing game play where the player character has disconnected from one swing point in response opening of the user's mouth and is traveling toward the next swing point.

The vertically scrolling world 106 of the interactive game 100 includes swing points 110 that allow the game character 108 to move upwards away from the monster 109 by swinging about one swing point 110 and jumping to another swing point 110, as shown in FIGS. 3 and 4. The vertically scrolling world 106 may also include a plurality of collectible items 112 such as coins, food items, gems, or other collectibles that may be acquired by the game character 108 when the game character 108 comes into contact with the collectible items 112 while traveling between the swing points 110. The interactive game 100 may also display a score 114 accumulated by the user during a game play session and a timer 116 indicating duration of the game play session. The game world 106 may expand as the player character 108 progresses through the interactive game 100, providing a continuous game play flow, which may advantageously encourage users to participate in longer game play sessions and provide motivation to the users to play the interactive game 100 often.

The exemplary interactive game 100 detects, using the camera 22, the chewing motion of the user and causes the player character 108 to perform one or more actions in response to the detected chewing motion of the user. For example, the user may use chewing motion to control swing speed around a swing point 110 and open his or her mouth to disconnect from the swing point 110 to move to the next swing point 110, optionally collecting one or more collectible items 112 on the way. In one embodiment, detection of chewing increases swing speed, i.e., rotation speed, by a predetermined amount, regardless of the rate of chewing. The interactive game 100 may detect an increase in the speed of the chewing motion of the user and correspondingly increase the speed of rotation of the player character 108 about a swing point 110. Similarly, the interactive game 100 may detect a decrease in the speed of the chewing motion of the user and correspondingly decrease the speed of rotation of the player character 108 about a swing point 110. The chewing motion of the user may also be used to control other in-game features of the interactive game 100, including, for example, navigating grind rails and alerting non-player characters such as additional monsters and the like.

Each game play session of the interactive game 100 may include a point scoring system combined with point multipliers to advantageously provide for point goal setting by the users, which may extend long-term playability of the interactive game 100. For example, game play scores may be based on accumulating the collectibles 112 located throughout each level of the game world 106 and/or based on distance progressed through a level or levels of the interactive game 100. Multipliers may allow the users to gain higher scores over a number of gaming sessions, thereby permitting the users to progress further in the interactive game 100.

User scores beyond a certain predetermined number, for example, above 100,000, may be displayed in association with an alias or nickname of the user as "badges" and/or "medals." The "badges" and/or "medals" may be stored on the mobile device 10, or on a remote server including a social game center (e.g., Apple Game Center), where the "badges" and "medals" may be displayed to other users of the interactive game 100. A multiplayer game center may include a leader board indicating the highest scores achieved by the users when playing the interactive game 100 and/or the largest distances traveled by player characters 108 controlled by the users of the interactive game 100. Such display of scores and accomplishments of the users in a social game center or other social media may promote multiplayer competition.

Figure 6:
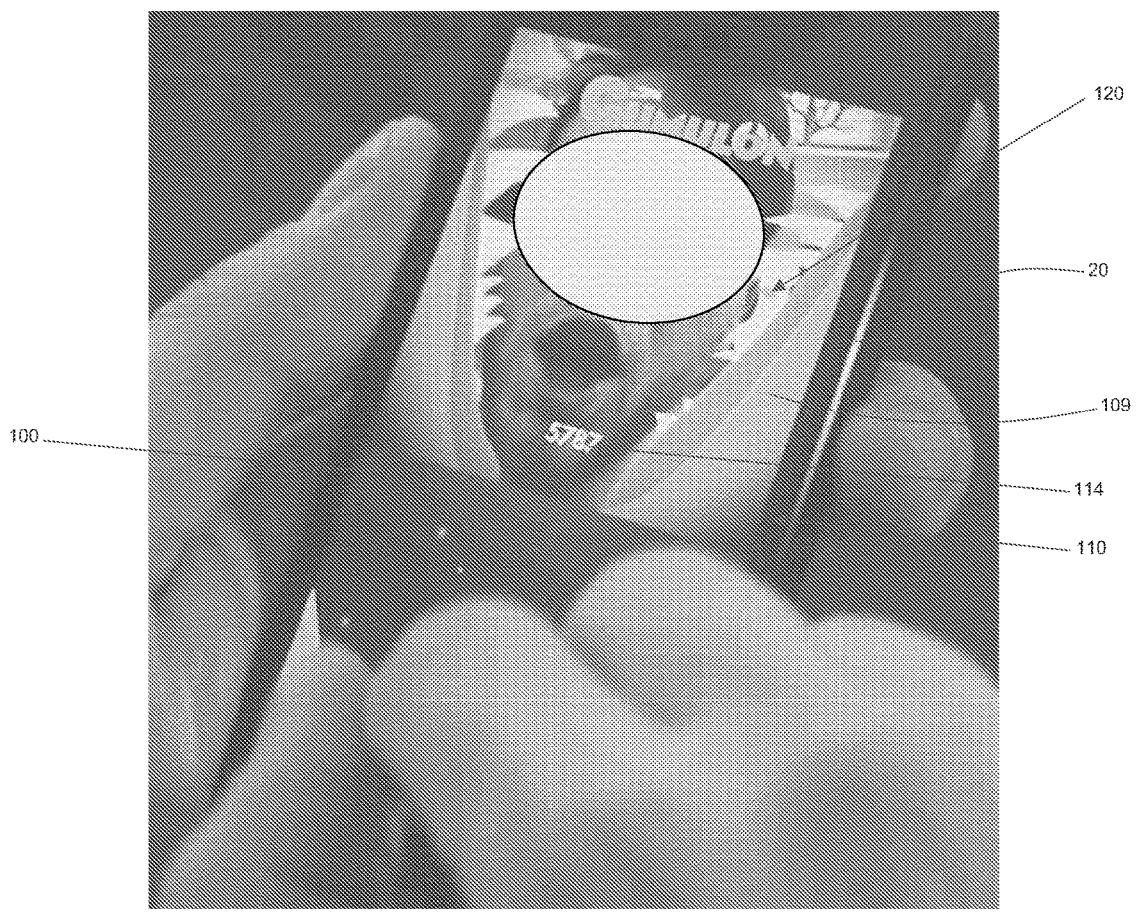
FIG. 6 is a perspective view of the mobile device of FIG. 1 showing a "game over" graphic of the interactive electronic game, depicting a user's face surrounded by jaws and teeth of the monster and showing the name of the game and a score achieved by the user during a single game play session.

At the end of each game play session when the user loses by permitting the player character 108 to fall into the mouth of the monster 109 pursuing the player character 108, the interactive game 100 permits the user, using the camera 22 of the mobile device 10, to snap a photographic image 118 of at least the face of the user. In the embodiment shown in FIG. 6, the image 118 is combined with artwork from the interactive game 100 to produce a personalized graphic 120 such as an image of the face and/or head of the user inside the mouth of the monster 109, and optionally including the score 114 accumulated by the user during the game session. The interactive game 100 may also permit the mobile device 10 to save this graphic image 120 to the memory 16 of the mobile device, for example, to a "camera roll" on a hard drive as provided by mobile devices 10 such as IPhones and Ipads.

Figure 7:
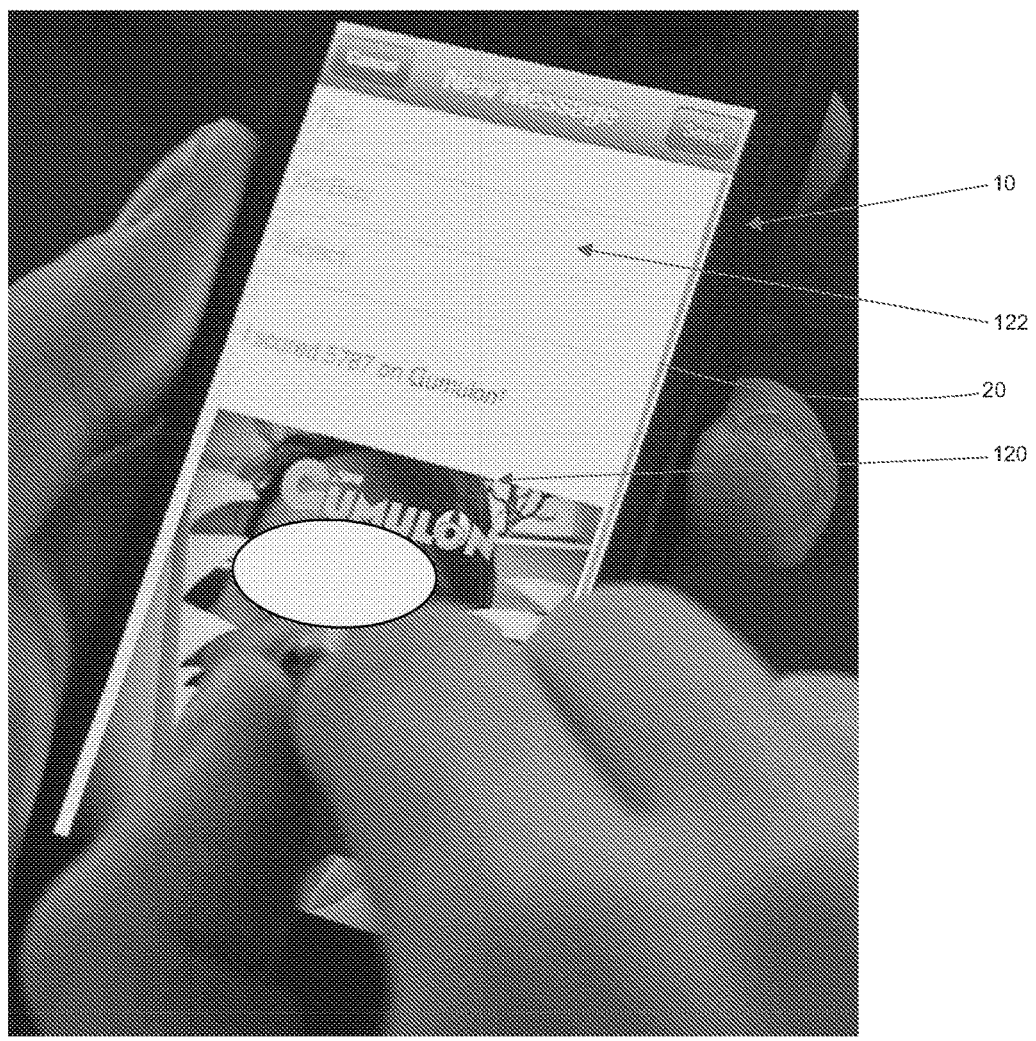
FIG. 7 is a perspective view of the mobile device of FIG. 1 showing the "game over" graphic of the interactive electronic game where the "game over" graphic is incorporated into an electronic mail for sending to one or more recipients.

As shown in FIG. 7, the interactive game 100 permits the user to share the graphic 120 with one or more recipients via email 122. In addition, the interactive game 100 permits the user to share the graphic 120 with one or more recipients via text messaging. In addition, the interactive game 100 permits the user to share the graphic 120 with one or more recipients via one or more social media websites, such as Facebook, Twitter, Instagram, or the like. The sharing of the graphic 120 by the user with other recipients via email, text messaging, and/or social media websites may interest an increasing number of users to play the interactive game 100 while promoting a consumer product such as chewing gum associated with the interactive game 100 to more and more users. As referenced in the preceding paragraph, the interactive game 100 may be associated with one or more consumer products such as chewing gum to advertise, market, and promote sales of such consumer products. For example, the interactive game 100 may be used in conjunction with marketing of a chewable product such as gum, candy, or the like. As described in more detail below, the interactive game 100 may include a feature in which data associated with a particular consumer product may be detected by a device associated with the interactive game 100 to affect play of the game. The data may be in the form of graphics such as a QR code, bar code or other code displayed on an exterior or interior of a package containing the consumer product, on a wrapper of a consumer product itself such that a camera of a hand-held electronic device (e.g., the camera 22 of the mobile device 10) having the interactive game 100 installed may be used to read the QR code, bar code, or another code. Alternatively, coded data (e.g., a number, or a combination of letters and numbers) may be provided to a user of the hand-held electronic device on a website, in an e-mail or text message, or in another way, to be entered manually into the interactive game 100 by the user.

Figure 8:
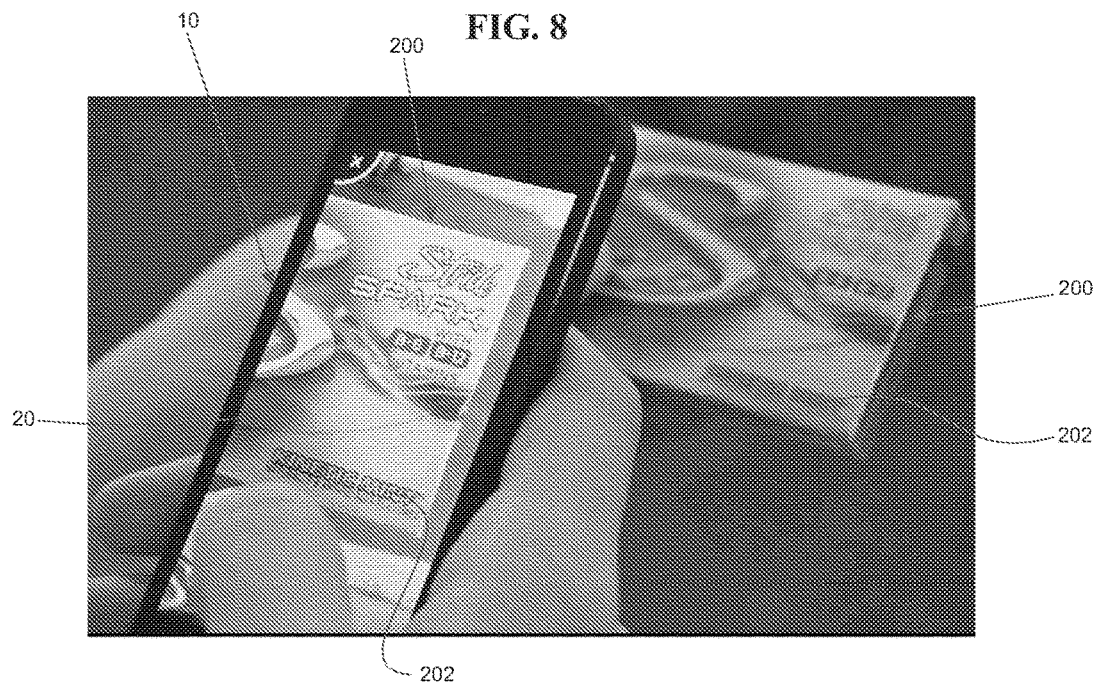
FIG. 8 is a perspective view of the mobile device of FIG. 1 taking a snapshot of an exemplary chewing gum pack including a coded symbol for incorporation into the interactive game to enhance game play.
Figure 9:
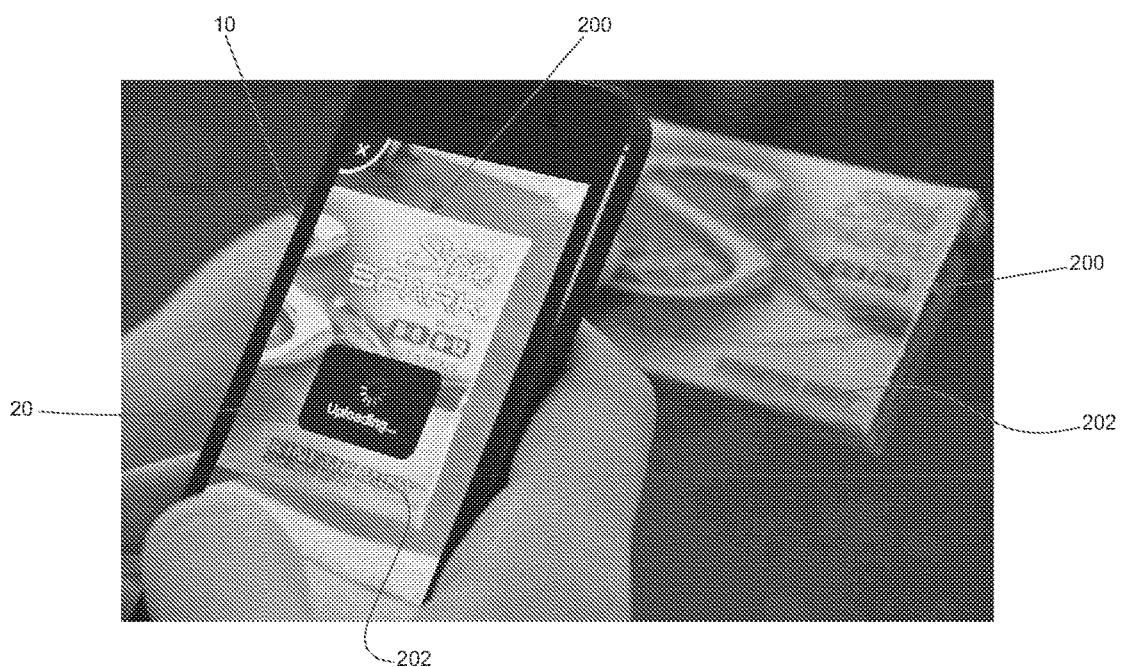
FIG. 9 is the view of FIG. 8 showing the coded symbol acquired from the gum pack being uploaded into the interactive game.
Figure 10:
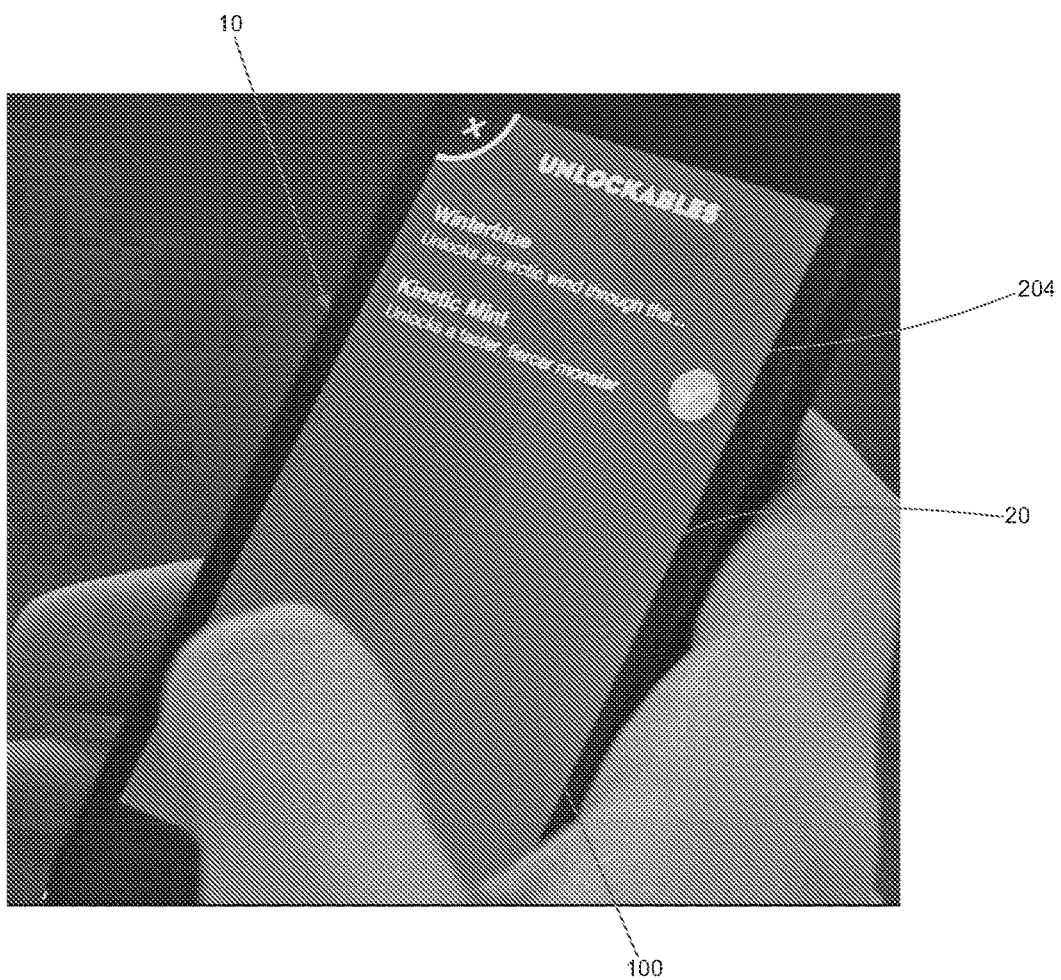
FIG. 10 is a perspective view of the mobile device of FIG. 1 showing a game play upgrade for a game play session of the interactive game based on the uploaded coded symbol.

For example, with reference to FIGS. 8 and 9, a chewing gum product may be associated with the interactive game 100 by including a coded image 202 on its exterior or interior packaging 200. The coded image 202 may include words recognizable by and visible to a user, as shown in FIGS. 8 and 9. Alternatively, the coded image 202 may include symbols that may not be read by a user (e.g., a bar code), or symbols that are not visible to the user. The coded image 202, when photographed by the camera 22 of the mobile device 10 having the interactive game 100 installed thereon, and uploaded into the interactive game 100, for example, as a patch, provides new game content 204, as shown in FIG. 10, that may enhance game play of the interactive game 100.

For example, with the interactive game 100 running on the mobile device 10, the user may select an option to photograph and/or scan a coded image 202 on an exterior of the package 200 using the camera 22 of the mobile device 10, as shown in FIG. 8. The coded image 202 photographed and/or scanned by the camera 22 is then uploaded to the mobile device 10 and incorporated into the interactive game 100 as shown in FIG. 9 as data that provides additional content such as, for example, game upgrades or patches as shown in FIG. 10. The interactive game 100 may be used to facilitate marketing of one more identical or different chewable consumer products. For example, one coded image representing a patch for the interactive game 100 may be sold on one package of one type of a chewable consumer product (e.g., one type of gum), another coded image representing a different patch for the interactive game 100 may be sold on another package of the same consumer product, and yet another coded image representing yet another patch for the interactive game 100 may be sold on packaging of a different consumer product (e.g., another type of gum or a chewable product other than gum). This way, scanning different coded images on different consumer product packages using the camera 22 of the mobile device 10 provides user s with different game patches affecting game play of the interactive game 100 in different ways depending on which product package is scanned and which coded image is detected thereon.

An upgrade or patch acquired as a result of buying and scanning a pack of gum associated with the interactive game 100 may, for example, increase points and/or score multipliers associated with certain in-game actions or achievements, increase the speed of the player character 108 or the monster 109, create a wind that facilitates the player character 108 in moving upwards away from the monster 109, slow down the monster 109, provide the user with a second chance after the player character 108 is swallowed by the monster 109, or any other suitable upgrades that may enhance the game play. The incorporation into gum packs 200 of coded images and/or symbols decodable by the mobile device 10 as patches and/or upgrades for the interactive game 100 may facilitate user's interest in the interactive game 100 and promote sales of the gum packs 200.

The mobile device 10 may be a cellular phone (e.g., an IPhone or the like), a tablet computer (e.g., an IPad or the like), a hand-held video game console, or the like. The mobile device 10 may be a smart phone, such as a touchscreen cellular phone, or a conventional cellular phone that relies solely on input keys. The mobile device 10 may run on any operating system, for example, Apple OS, Android, or the like. While a specific interactive electronic game 100 has been described above with reference to FIGS. 2-10, it will be appreciated that the interactive game 100 may be in a form of any interactive electronic game appropriate for control by chewing motion of a user, such as an interactive electronic game when a player character or any other character moves or otherwise performs an action responsive to chewing motion by the user of the interactive game.

Figure 11:
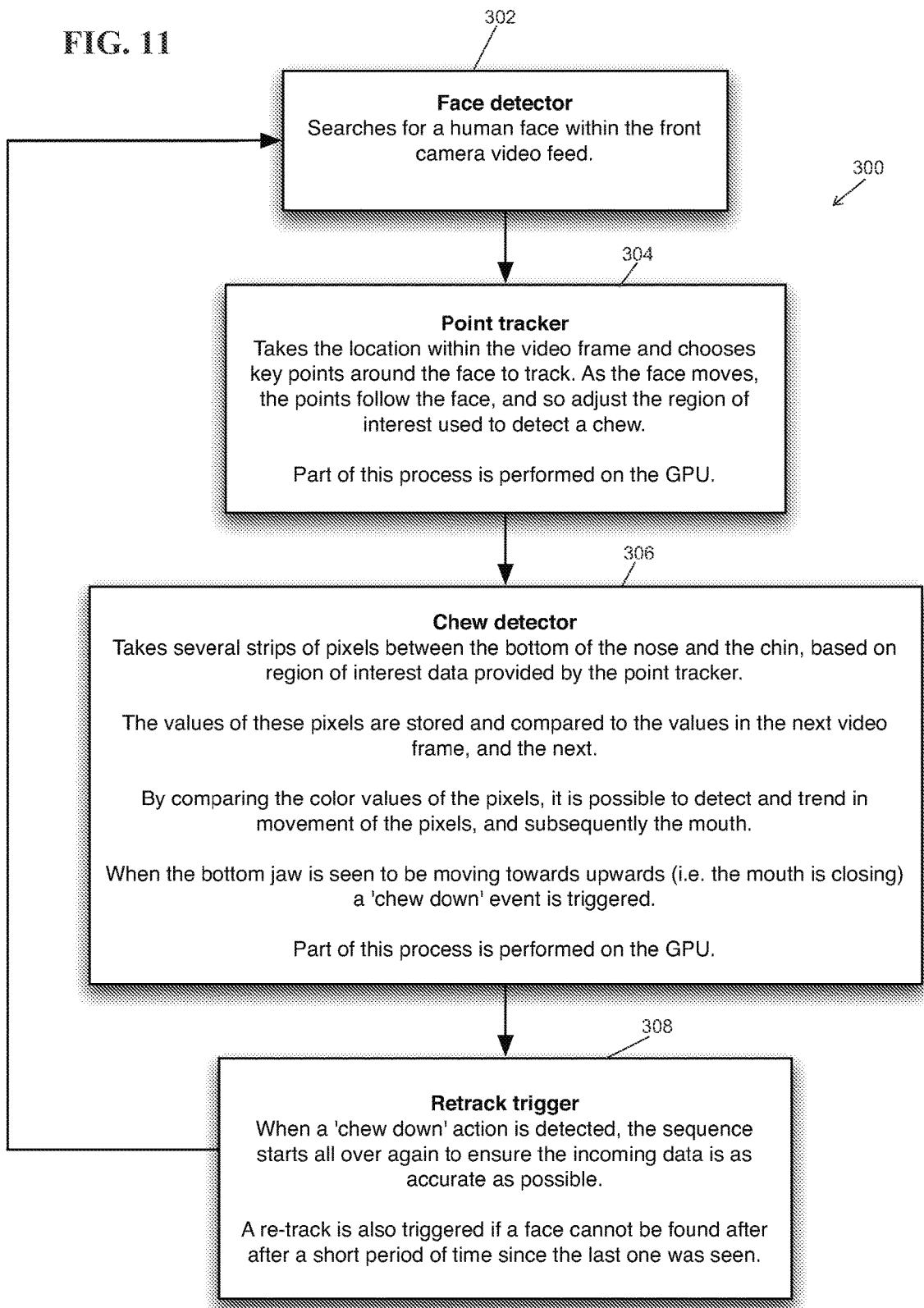
FIG. 11 is a flow chart illustrating an exemplary method of controlling the interactive game via chewing motion of a user.

An exemplary method 300 of detecting chewing motion of the user while calibrating and/or playing the interactive game 100 is illustrated in FIG. 11. In Step 302 of the method 300, a face detector component of the interactive game 100 according to one embodiment searches for a human face in a video feed generated by the camera 22 of the mobile device 10 when facing a user. Such a video feed may be displayed in the window 102 of the interactive game as shown in FIG. 2.

In Step 304, a point tracker component of the interactive game 100 selects one or more locations of the face of the user within a video frame and chooses key points around the face of the user to track. As the face of the user moves, the points follow the face, and adjust the region of interest used to detect a chew. Part of the process indicated in Step 302 may be performed on a graphics processing unit (GPU) of the mobile device 10.

In Step 306, a chew detector component of the interactive game 100 may take several strips of pixels between a bottom of the nose and the chin of the user, based on a region of interest data provided by the point tracker. The values of these pixels are stored, for example, in the memory 16 of the mobile device 10, and compared to the values in the subsequent video frames. By comparing color values of the pixels, it may be possible for the interactive game 100 to detect a trend in movement of the pixels, and consequently, a trend in movement of the mouth of the user. For example, when a bottom jaw of the user is detected by the camera 22 to be moving upwards, such as during a motion to close the mouth of the user, a 'chew down' event is triggered. Similarly to Step 302, part of Step 304 may be performed on the GPU of the mobile device 10.

In Step 308, a re-track trigger component of the interactive game 100 may, when a 'chew down' action is detected, restart the sequence all over again to ensure that the incoming data is as accurate as possible. A re-track may also be triggered if a face of the user cannot be found after a predetermined short period of time (e.g., 1 second, 2 seconds, 3 seconds, 5 seconds, 10 seconds, or longer) since the last 'chew down' action was seen by the camera 22 of the mobile device 10.

The method may include displaying various promotional, instructional or other messages such as an "Insert Gum" message prior to initiation of game play. The method may also include providing an outline of a face in a window displaying the player's face to facilitate a player's alignment of an image of his or her face in a proper position in the display. When the player's face is properly aligned with the outline, a message such as "Let's go!" may be displayed, and calibration and/or game play may be immediately initiated. Alternatively, the game may provide the user with the opportunity to initiate play, e.g., by awaiting detection of a user input such as a chewing motion or opening of the user's mouth, and may prompt the user to provide the requisite input, e.g., by displaying a message such as "Chew once to initiate play."

If the player's face moves relative to the camera thereafter such that the player's face is out of proper position, the game may pause and display one or more messages to instruct the player on how to correct the problem, such as "Can't see you" or "Off Center" or "Too Far" or "Too Close" and/or "Move your face to the outline" or "Keep steady." These messages or similar messages may also be displayed prior to initial detection of the player's face in proper position. Again, once proper position of the player's face is achieved, the game may start immediately, or may provide the user with the opportunity to control resumption of play, e.g., by awaiting detection of a user input such as a chewing motion or opening of the user's mouth, and may prompt the user to provide the requisite input, e.g., by displaying a message such as "Chew once to initiate play."

When certain thresholds are achieved, e.g., certain point levels are reached, or when a certain position in the field of play is reached, the game may recognize the achievement by providing, e.g., the opportunity for the player to unlock a feature of the game, and may notify the player by displaying a written phrase such as "New Unlock Available."

As alternatives to visible display of words and phrases as mentioned above, the game may provide other visual cues such as icons, emoticons, pictures, etc., alone or in combination with words or phrases, and/or audible cues. The game may have alternative methods of play, e.g., the game may provide the player with the option to control play by tapping the screen instead of providing inputs detected by the camera, and may provide for premiums such as increased scoring opportunities, or a points multiplier, for play in one mode or the other, e.g. providing for double points for achievements in the mode in which game play is controlled by camera inputs.

Certain functions of the game, such as detection of chewing or other mouth movements may be implemented by software such as that referred to above and filed as an appendix to this patent application.

The methods described herein advantageously provide users of mobile devices with an ability to control play interactive electronic games installed on the mobile devices simply by detecting chewing motion of the user and translating such chewing motion into movement of a player character in the interactive game. Further, interactive games as described above advantageously provide users with an ability to photograph and/or scan packaging of consumer products associated with the interactive game to facilitate advertising and sales of such consumer products.

What is claimed is:

1. A method of controlling an interactive game on a display screen of a mobile electronic device, the method comprising:
    displaying on the display screen of the mobile electronic device the interactive game including a character controllable by a user of the mobile electronic device;
    detecting, using a camera, chewing motion of the user; and
    causing the character to perform a first action on the display screen in response to the chewing motion of the user;
    wherein the displaying the interactive game includes displaying a window overlaying a portion of the interactive game on the display screen and displaying in the window a real time video of at least a mouth of the user captured by the camera.

2. The method of claim 1, further comprising displaying in the window a virtual grid overlaying at least the mouth of the user displayed in the window; and modifying the virtual grid in real time in response to chewing motion of the user.

3. A method of controlling an interactive game on a display screen of a mobile electronic device, the method comprising:
    displaying on the display screen of the mobile electronic device the interactive game including a character controllable by a user of the mobile electronic device;
    detecting, using a camera, chewing motion of the user; and
    causing the character to perform a first action on the display screen in response to the chewing motion of the user;
    wherein the detecting chewing motion of the user includes detecting the chewing motion of the user by determining, via the camera, position of at least one of chin, jaw, lips, and mouth of the user relative to a position of a virtual grid overlaying at least the mouth of the user.

4. The method of claim 3, further comprising calibrating the chewing motion of the user relative to the virtual grid prior to initiating start of the interactive game.

5. A method of controlling an interactive game on a display screen of a mobile electronic device, the method comprising:
    displaying on the display screen of the mobile electronic device the interactive game including a character controllable by a user of the mobile electronic device;
    detecting, using a camera, chewing motion of the user; and
    causing the character to perform a first action on the display screen in response to the chewing motion of the user;
    wherein the detecting the chewing motion of the user includes detecting a speed of the chewing motion of the user and causing the character on the display screen to move faster in response to detecting an increase in the speed of the chewing motion and to move slower in response to detecting a decrease in the speed of the chewing motion.

6. A method of controlling an interactive game on a display screen of a mobile electronic device, the method comprising:
    displaying on the display screen of the mobile electronic device the interactive game including a character controllable by a user of the mobile electronic device;
    detecting, using a camera, chewing motion of the user; and
    causing the character to perform a first action on the display screen in response to the chewing motion of the user;
    further comprising detecting opening of a mouth of the user, and causing the virtual character to perform a second action in the interactive game different from the first action.

7. A method of controlling an interactive game on a display screen of a mobile electronic device, the method comprising:

displaying on the display screen of the mobile electronic device the interactive game including a character controllable by a user of the mobile electronic device;

detecting, using a camera, chewing motion of the user; and causing the character to perform a first action on the display screen in response to the chewing motion of the user;

further comprising taking a photograph of at least a face of the user when a session of the video game ends, and incorporating at least a portion of the photograph into a graphic of the interactive game including a score accumulated by the user while playing the interactive game, and further comprising permitting the user to share the graphic with one or more people via at least one of an electronic mail, a text message, and a social media website.

8. A method of controlling an interactive game on a display screen of a mobile electronic device, the method comprising:

displaying on the display screen of the mobile electronic device the interactive game including a character controllable by a user of the mobile electronic device;

detecting, using a camera, chewing motion of the user; and causing the character to perform a first action on the display screen in response to the chewing motion of the user;

further comprising scanning an image on a packaging of a consumer product using the mobile electronic device and incorporating data retrieved in response to the scanning of the image into the interactive game to affect game play of the interactive game.

9. The method of claim 8, wherein the mobile electronic device is at least one of a mobile phone, a tablet computer, and a hand-held video game console.

10. An apparatus configured to allow play of an interactive game, the apparatus comprising:

a display screen;

a camera;

a memory storing instructions relating to the interactive game; and a processing device in operative communication with the display screen, the camera, and the memory, the processing device configured to access the instructions to effect:

displaying on the display screen the interactive game including a character controllable by a user of the electronic device;

displaying a window overlaying a portion of the interactive game on the display screen to show an image of at least a mouth of the user captured by the camera;

displaying in the window a virtual grid overlaying at least the mouth of the user and movable in real time in response to chewing motion of the mouth of the user;

detecting the chewing motion of the user by determining, via the camera, position of at least one of a chin, a jaw, a lip, and a mouth of the user relative to the virtual grid; and causing the character to perform a first action on the display screen in response to the chewing motion by the user.

11. The apparatus of claim 10, wherein the processing device is configured to effect detecting opening of the mouth of the user and causing the character to perform a second action different from the first action on the display screen.

12. The apparatus of claim 10, wherein the processing device is configured to effect using the camera to take a photograph of at least a face of the user when a session of the interactive game ends and incorporate at least a portion of the photograph into a graphic of the interactive game including a score accumulated by the user while playing the interactive game, and wherein the processing device is configured to effect using the camera to scan an image on a packaging of a consumer product and incorporating data retrieved in response to the scanning of the image into the interactive game to affect game play of the interactive game.

13. A non-transitory computer readable storage medium for storing instructions that, in response to execution by a processor, cause the processor to perform operations for displaying and controlling an interactive game on an electronic device, the operations comprising:

displaying on the display screen of the electronic device the interactive game including a character controllable by a user of the electronic device;

detecting, using a camera, chewing motion of the user; and causing the character to perform a first action on the display screen in response to the chewing motion of the user;

further comprising instructions that, in response to execution by the processor, cause the processor to perform further operations comprising detecting opening of a mouth of the user and causing the virtual character to perform a second action different from the first action on the display screen.

14. A non-transitory computer readable storage medium for storing instructions that, in response to execution by a processor, cause the processor to perform operations for displaying and controlling an interactive game on an electronic device, the operations comprising:

displaying on the display screen of the electronic device the interactive game including a character controllable by a user of the electronic device;

detecting, using a camera, chewing motion of the user; and causing the character to perform a first action on the display screen in response to the chewing motion of the user;

further comprising instructions that, in response to execution by the processor, cause the processor to perform further operations comprising taking a photograph of at least a face of the user when a session of the interactive game ends and incorporating at least a portion of the photograph into a graphic of the interactive game including a score accumulated by the user while playing the interactive game, and further comprising instructions that, in response to execution by the processor, cause the processor to perform further operations comprising scanning an image on a packaging of a consumer product and incorporating data retrieved in response to the scanning of the image into the interactive game to affect game play of the interactive game.

15. A method of interacting with customers of a chewable product through a game, comprising:

marketing a plurality of different chewable products to customers; and providing a game that is playable on a hand-held device that includes a camera and a display screen;

displaying on the display screen an image of a game character that is capable of travel relative to other images on the display screen;

processing input from the camera to detect a chewing motion of a mouth of a player;

in response to detection of the chewing motion, affecting travel of the game character displayed on the screen such that game play is controlled at least partially by detection of the chewing motion.

16. The method of claim 15 further comprising detecting packaging of the plurality of different chewable products with the camera, and affecting the game play in response to the detection of such packaging in different ways depending on which of the plurality of different chewable products is detected.

17. The method of claim 16 wherein the affecting movement of the character comprises accelerating movement of the game character relative to images in a 2D vertically scrolling world in response to the player's chewing.

18. The method of claim 15, wherein the processing input from the camera comprises detecting a nose and chin in a first frame using software running on a CPU; detecting a region darker than adjacent regions between the mouth and chin in subsequent frames using software running on a graphics processing unit; and comparing changes in and adjacent to the region from frame to frame by analysis of individual pixels using a graphics processing unit.

* * * * *